Patented Dec. 13, 1938

2,139,711

UNITED STATES PATENT OFFICE 2,139,711

AROMATIC MERCURY MALATES AND PROCESS OF MAKING THE SAME

Carl N. Andersen, Wellesley Hills, Mass., assignor to Lever Brothers Company, a corporation of Maine No Drawing. Application January 8, 1938, Serial No. 184,034

3 Claims. (Cl. 260—434)

The present invention relates to certain new aromatic mercury malates.

It is an object of my invention to produce new aromatic mercury malates that are useful as germicides and for other purposes.

I have discovered that when the acidic hydrogen atom or atoms of malic acid is replaced by the essential radical of certain aromatic mercury compounds, compounds are produced which have extraordinarily high potency as antiseptics and germicides and at the same time are characterized by relatively low toxicity and other desirable properties.

The compounds I have produced may be described as having the general formula $(RHg)_x R_1$, in which R represents an aromatic structure to a carbon atom of which the mercury is directly attached; in which $R_1$ represents the malic acid radical that is linked to the RHg group or groups through the replacement of acidic hydrogen; and in which $x$ represents the number of RHg groups in the compound and is an integer of at least one and not more than the number of acidic hydrogens in malic acid. While the words "group" and "groups" are used hereinafter, it will be understood that these words must be interpreted as single or plural depending upon the value of $x$.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for any mono or polycyclic hydrocarbon group in which all of the nuclear carbon atoms, other than the one attached to mercury, and any side chain carbon atoms, have their valences satisfied either by carbon or hydrogen. Examples are the phenyl, diphenyl, tolyl, xylyl and naphthyl groups.

The method by which the compounds are prepared, as well as the number of compounds I have investigated, shows that all of the compounds within the generic group above mentioned may be prepared. They have in greater or lesser, but always in a relatively high degree, antiseptic and germicidal properties. I therefore, regard my invention as generic to and including the entire group of aromatic mercury salts of malic acid as defined heretofore.

The general method of producing these new compounds consists in reacting together malic acid and a compound containing an aromatic mercury radical of the above defined type. A liquid reacting medium is preferably employed. The compound resulting from the reaction is usually relatively insoluble as compared with the reacting components and upon its precipitation may be filtered, washed and dried. The aromatic mercury compound I prefer is the hydroxide because in the reaction of the hydroxide with the acid, water is the only other product produced and the resulting aromatic mercury salt may be easily purified. My novel compounds may also be prepared by employing a soluble aromatic mercury salt, for example, the acetate or lactate, in a reaction with malic acid. The aromatic mercury salt formed during the reaction is of a relatively low solubility as compared with malic acid and with the aromatic mercury salt formed during the reaction. Compounds may also be prepared by reacting a malic acid derivative, such as an ester, with an aromatic mercury compound to form the corresponding aromatic mercury salt. Any of these general methods may be employed in producing the compounds comprising this invention.

Any inert liquid may be used as the medium for carrying out the reaction, inasmuch as its only function is to bring the reacting components together. Water may be used because of its availability. Other solvents are equally as satisfactory, such as alcohol, acetone, benzol, and any other inert organic solvent or mixtures of any of these materials with each other or with water.

The process may be carried out at any temperature, for example, room temperature and it is not dependent upon the use of an elevated temperature. In most instances, however, I find that the use of heat facilitates the solution of reacting components and permits the use of solutions of greater concentration.

The reacting materials are generally employed in substantially theoretical quantities. In some cases, if desired, approximately 10% excess of the malic acid may be employed in order to insure complete conversion of the aromatic mercury compound.

Inasmuch as the malic acid is a polybasic acid, one or both of the acidic hydrogens may be replaced by the aromatic mercury radical. The number of hydrogens replaced is dependent upon the amounts of the reacting components. If less than all of the acidic hydrogens are replaced, the corresponding acid salts will be formed.

Mixed salts in which the acidic hydrogens are replaced by different radicals may also be prepared including those in which different aromatic mercury radicals replace the acidic hydrogen and those in which any other positive radical, in particular alkali metals, are attached to the acid radical along with the aromatic mercury radical.

Compounds of the latter type may be prepared by reacting an alkali metal acid salt of malic acid with an aromatic mercury compound or by reacting an alkali metal base with the acid along with the aromatic mercury compound.

The following is illustrative of the preferred method of preparing the compounds, and is illustrative of a representative organic mercury compound falling within the generic class heretofore described as constituting my invention:

5.88 grams of phenylmercury hydroxide is dissolved in 2 liters of water. The solution is then filtered. To the filtrate is added 1.47 grams of malic acid dissolved in 100 cc. of water. The mixture is brought to boiling and then allowed to stand until precipitation is complete. The precipitate is then separated by filtration, washed and dried. The resulting product has the solubility of about 1 gram in 100 cc. of warm water and melts at 202° C. It is the compound diphenylmercury malate.

The monophenylmercury malate may be prepared by employing double the quantity of malic acid in the procedure outlined above. Other similar compounds, for example, the tolylmercury malate and the naphthylmercury malate may be prepared by employing corresponding molecular amounts of tolylmercury hydroxide and naphthylmercury hydroxide, respectively.

From the above description, it will be readily apparent to one skilled in the art how other members of the above defined group may be prepared.

The compounds produced as above described are characterized by extraordinarily high potency as antiseptics and germicides. Tests in accordance with Circular 198, of the U. S. Dept. of Agriculture, described as the F. D. A. method, clearly indicate this excellence.

Thus, after an exposure of 15 minutes, an aqueous solution of phenylmercury malate kills standard cultures of *Eberthella typhi* (typhoid bacillus) at 37° C. in dilutions as great as 1:100,000. When tested against *Staphylococcus aureus* by the same method and at the same temperature, the compound killed this organism after 15 minutes' exposure in a dilution of 1:35,000.

In addition to their germicidal properties, all of the compounds are characterized by relatively low toxicity. Because of these properties, it is possible to use them in extreme dilutions and in many situations where known germicides, because of toxic or other undesirable properties, cannot be employed. They may be administered externally and locally and in some cases may be administered internally with satisfactory results from the germicidal standpoint and without harmful effect.

The compounds retain their germicidal activity when incorporated in soap and various menstruums employed in preparing germicidal compositions. They may be employed in aqueous or other solutions and may be formed into various preparations such as mouth washes, tooth pastes, soaps, etc. The compounds may be used for other purposes, such as sterilization of inanimate objects, particularly surgical equipment, and preventing the formation of mildew in sizes.

This application is a continuation in part of my application Serial No. 694,202, filed October 18, 1933.

I claim:

1. An organic mercury compound having the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents the radical of malic acid that is linked to the RHg group through replacement of acid hydrogen; and in which $x$ represents the number of RHg groups in the compound and is an integer of at least one and not more than the number of acidic groups in malic acid.

2. A phenylmercury malate.

3. In a method of making phenylmercuric malate, the step of heating phenylmercuric hydroxide with malic acid to a reacting temperature in the presence of a substantially inert liquid.

CARL N. ANDERSEN.